United States Patent [19]

Meistrick et al.

[11] E Patent Number: Re. 33,052

[45] Reissued Date of Patent: Sep. 12, 1989

[54] COMPRESSION RELEASE RETARDER WITH VALVE MOTION MODIFIER

[75] Inventors: Zdenek S. Meistrick, Bloomfield; Raymond N. Queeneville, Suffield, both of Conn.

[73] Assignee: The Jacobs Manufacturing Company, Bloomfield, Conn.

[21] Appl. No.: 281,338

[22] Filed: Dec. 8, 1988

Related U.S. Patent Documents

Reissue of:

[64] Patent No.: 4,706,624
Issued: Nov. 17, 1987
Appl. No.: 872,494
Filed: Jun. 10, 1986

[51] Int. Cl.[4] ..... F02D 9/06

[52] U.S. Cl. ..... 123/321; 123/90.16

[58] Field of Search ..... 123/90.15, 90.16, 321, 123/322, 347

[56] References Cited

U.S. PATENT DOCUMENTS

| | | | |
|---|---|---|---|
| 4,384,558 | 5/1983 | Johnson | 123/321 |
| 4,398,510 | 8/1983 | Custer | 123/321 X |
| 4,399,787 | 8/1983 | Cavanagh | 123/321 |
| 4,423,712 | 1/1984 | Mayne et al. | 123/321 |
| 4,485,780 | 12/1984 | Price et al. | 123/321 |
| 4,510,900 | 4/1985 | Quenneville | 123/321 |
| 4,572,114 | 2/1986 | Sickler | 123/321 X |
| 4,592,319 | 6/1986 | Meistrick | 123/321 |

*Primary Examiner*—Tony M. Argenbright
*Attorney, Agent, or Firm*—Donald E. Degling

[57] ABSTRACT

A process and apparatus are provided to increase the retarding horsepower of a compression release engine retarder driven from the exhaust valve pushtube or the fuel injector pushtube. The mechanism includes a plenum communicating with the exhaust valve slave piston and the master piston driven by a remote exhaust valve pushtube or the fuel injector pushtube. A trigger check valve is located between the master piston and exhaust valve slave piston so that the initial motion of the master piston delivers energy to the plenum. At a predetermined point in the travel of the master piston, the trigger check valve is opened by the master piston to permit the delivery of the energy stored in the plenum to the slave piston. Additional pumping capability is provided by a second master piston while a control check valve communicating with the second master piston limits the intake of hydraulic fluid into the system after working pressures have been attained to that hydraulic fluid which may leak from the system. The process includes cyclically storing energy in the plenum, releasing the stored energy from the plenum at a predetermined point in the travel of the master driven by the exhaust or fuel injector pushtube and directing the stored energy to the slave piston whereby the exhaust valve is opened rapidly at a predetermined time.

34 Claims, 9 Drawing Sheets

FIG. 2A
PRIOR ART
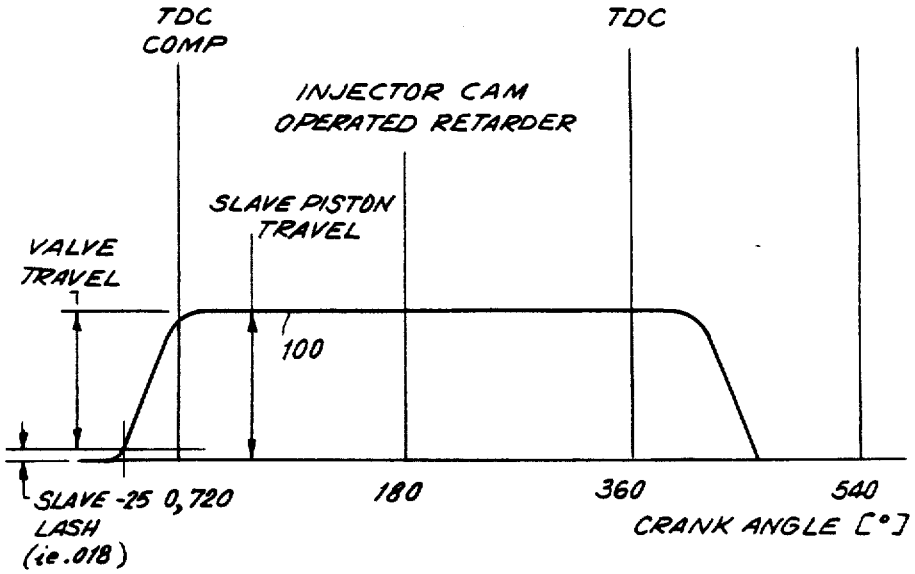
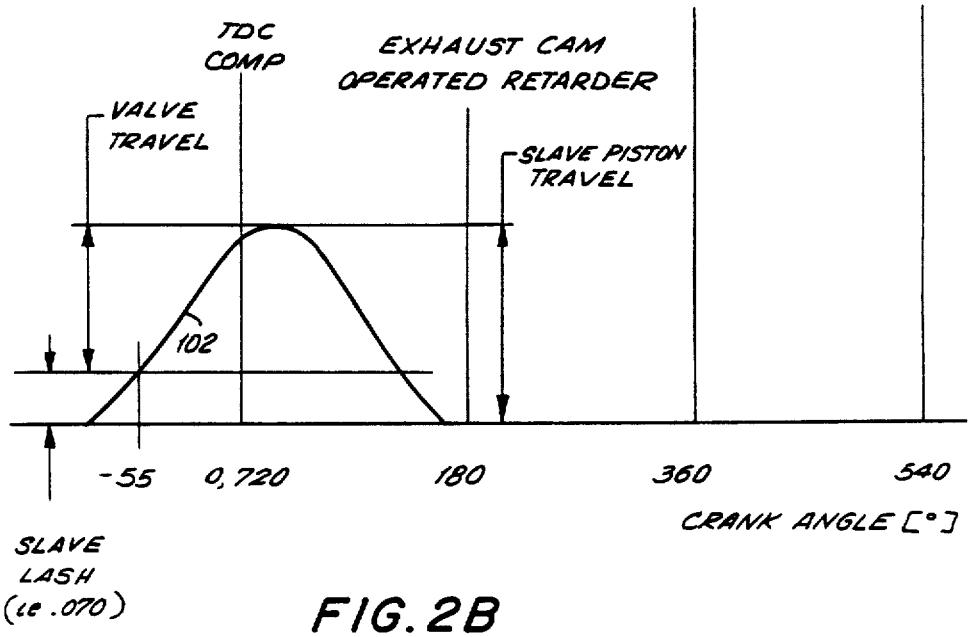
FIG. 2B
PRIOR ART

"OFF"

"ON"

~ 460°

~ 680°

~14°

~140°

COMPRESSION RELEASE RETARDER WITH VALVE MOTION MODIFIER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to engine retarders of the compression release type. More particularly, the invention relates to an apparatus and method for modifying the motion of the exhaust valve so as to open the valve more rapidly and at a predetermined time. The invention is particularly adapted for use in engines where the retarder is driven from an exhaust or intake cam.

2. The Prior Art

Engine retarders of the compression release type are well-known in the art. In general, such retarders are designed temporarily to convert an internal combustion engine into an air compressor so as to develop a retarding horsepower which may be a substantial portion of the operating horsepower normally developed by the engine in its powering mode.

The basic design of the compression release engine retarder is disclosed in the Cummins U.S. Pat. No. 3,220,392. That design employs an hydraulic system wherein the motion of a master piston actuated by an intake, exhaust or injector pushrod or rocker arm controls the motion of a slave piston which, in turn, opens the exhaust valve near its top dead center position whereby the work done during the compression stroke of the engine piston is not recovered during the expansion or power stroke but, instead, is dissipated through the engine exhaust and cooling systems.

With compression ignition engines having a fuel injector driven from a third cam on the engine camshaft, it has been found to be desirable to derive the motion for the compression release retarder from the fuel injector pushtube for the cylinder experiencing the compression release event. The fuel injector pushtube is a desirable source of motion both because it peaks very shortly after the top dead center (TDC) position of the piston following the compression stroke and also because the effective stroke of the injector pushtube is completed in a relatively short period, e.g., 25-30 crankangle degrees. Further development of the injector-driven compression release retarder has disclosed the desirability of advancing the timing of the compression release event and this has been accomplished by a timing advance mechanism as disclosed in Custer U.S. Pat. No. 4,398,510. The Custer mechanism automatically decreases the clearance or "lash" in the valve train mechanism so that the motion of the injector pushtube-driven master piston is delivered to the exhaust valve sooner. As the "lash" approaches zero, the motion of the exhaust valve approaches the motion defined by the injector cam. Although the total exhaust valve travel can be increased or decreased by varying the ratio of the diameter of the master and slave pistons (i.e., the "hydraulic ratio"), the elapsed time during which motion occurs is determined by the motion of the master piston which, in turn, is defined by the shape of the fuel injector cam.

Many compression ignition engines employ fuel injection systems which are not driven from the engine camshaft and most spark ignition engines having fuel injection systems do not use an engine camshaft driven fuel injection system. Such engines, commonly known as two-cam engines to distinguish them from the three-cam engines referred to above, utilize a remote intake or exhaust valve pushtube or cam to operate the compression release retarder. The valve motions produced by the intake and exhaust valve cams are similar to each other but significantly different from the motion produced by the injector cam. Typically, exhaust and intake valves require more than 90 crankangle degrees to move from the closed to the fully open position. Additionally, the exhaust cam generates a motion that begins too early, reaches its peak too late and provides a total travel which is too great for optimum retarding performance. Partial compensation for these disadvantages can be effected by increasing the slave piston lash and increasing the hydraulic ratio of the master and slave pistons. Also, as disclosed in Price et al. U.S. Pat. No. 4,485,780, the rate at which the exhaust valve is opened may be increased and the time of opening correspondingly decreased by employing a second master piston driven by an appropriate intake pushtube. Although the time of opening using the invention of the Price et al. U.S. Pat. No. 4,485,780 may be reduced from about 90 to about 50 crankangle degrees, the time is still above that available with an injector cam-driven retarder. As a result, and prior to the present invention, substantially less retarding horsepower can be developed from an exhaust cam-driven retarder than from an injector cam-driven retarder when both are optimized for the same engine.

SUMMARY OF THE INVENTION

One of the principal advantages of the compression release retarder as disclosed in the Cummins U.S. Pat. No. 3,220,392 is that it may be incorporated into an engine without redesigning or replacing the camshaft or rocker arm assembly. This characteristic simplifies installations both in new engines and also, particularly, in retrofit installations on older engines. Applicants have maintained this important characteristic while improving the performance of an exhaust cam-driven compression release retarder to approach, or even exceed, the performance of an injector cam-driven retarder. While the invention is particularly directed to the exhaust (or intake) cam-driven retarder, it may also be applied to an injector cam-driven retarder. It will be understood that, in the latter case, the improvement in performance will be less marked.

In accordance with the present invention, applicants modify an exhaust cam-driven retarder by adding a plenum communicating with the slave pistons associated with the exhaust valves; a second master piston and control valve in parallel with the first master piston but driven by an intake valve cam; means to pressurize the plenum; and a trigger check valve actuated by motion of the first master piston. The trigger check valve may be set to open at any desired point with respect to the top dead center position of the engine piston so as to deliver rapidly a predetermined volume of high pressure oil to the slave piston, thus opening the exhaust valve rapidly at a predetermined time. The hydraulic system automatically admits fresh oil as makeup for leakage and automatically limits the maximum pressure in the plenum to that pressure required to perform the compression release function. While the invention is particularly adapted for use in two-cam engines where the master pistons are driven from the exhaust and intake cams, it may also be applied to a three-cam engine where the master pistons can be driven from any of the injector, exhaust or intake cams.

DESCRIPTION OF THE DRAWINGS

Additional advantages of the novel combination according to the present invention will become apparent from the following detailed description of the invention and the accompanying drawings in which:

FIG. 2A is a diagram showing the typical motion of an exhaust valve during the retarding mode of operation in a retarder driven by an injector cam.

FIG. 2B is a diagram showing the typical motion of an exhaust valve during the retarding mode of operation in a retarder driven by a remote exhaust or intake cam.

DETAILED DESCRIPTION OF THE INVENTION

Figures 1, 1A:
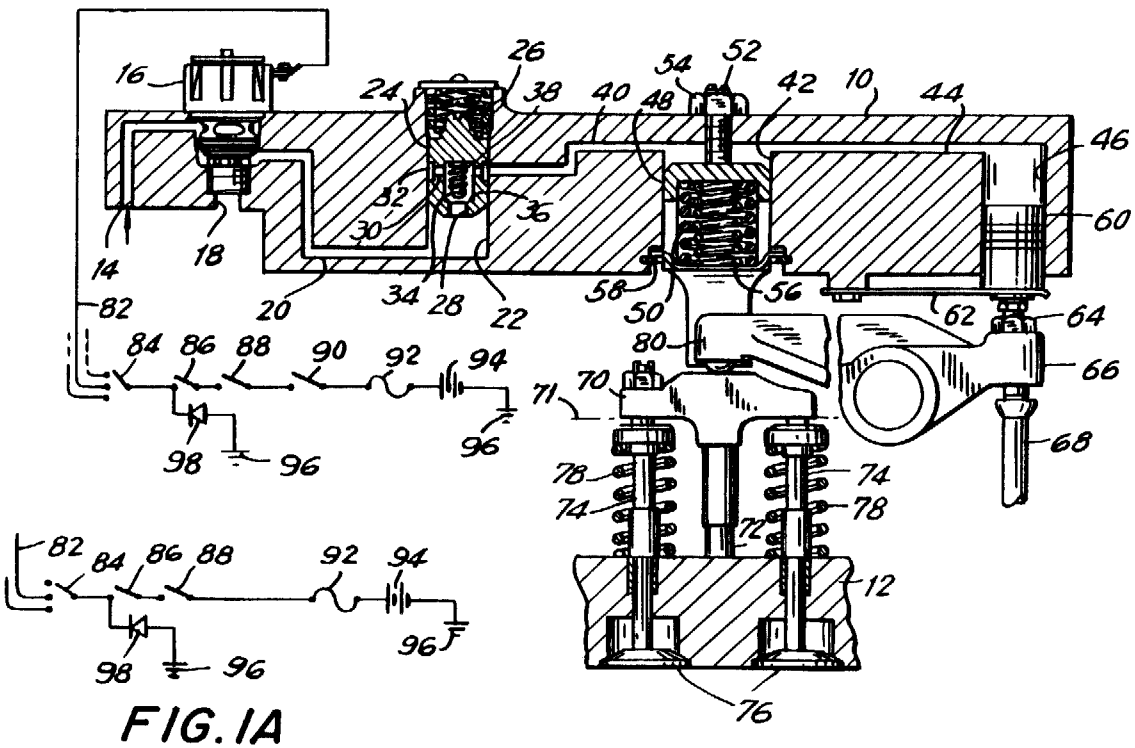
FIG. 1 PRIOR ART
FIG. 1 is a schematic diagram of a prior art compression release engine retarder of a type which may be modified to incorporate the principles and mechanisms of the present invention.
FIG. 1A is a fragmentary schematic diagram showing an alternative electrical circuit for the apparatus shown in FIG. 1.

In order that the present invention may clearly be distinguished from the now well-known compression release engine retarder, reference will first be made to FIG. 1 which illustrates schematically a typical compression release engine retarder driven from the injector pushtube for the same cylinder or from the exhaust pushtube for another cylinder. The retarder housing 10 is attached to the engine head 12 and carries the mechanism required to perform the retarding function. Typically, for exhaust cam driven retarders, one housing 10 will contain the mechanism for three cylinders of a six-cylinder engine and a second housing 10 will be used for the remaining three cylinders. Passageway 14 communicates between a two-position three-way solenoid valve 16 and the low pressure engine lubricating oil system (not shown). Drain passageway 18 communicates between the solenoid valve 16 and the engine sump (not shown) while passageway 20 communicates with control valve chamber 22. In the energized or "on" position of the solenoid valve 16, low pressure oil flows through passageways 14 and 20 and into the control valve chamber 22. In the deenergized or "off" position of the solenoid 16, passageways 18 and 20 are in communication so as to permit drainage of oil back to the engine sump (not shown).

A two-position control valve 24 is mounted for reciprocatory motion in the control valve chamber 22 and biased toward the bottom of the chamber 22 by a compression spring 26. The control valve 24 contains an axial passageway 28 which intersects a diametral passageway 30. A circumferential groove 32 communicates with the diametral passageway 30. A ball check valve 34 is biased against a seat 36 formed in the axial passageway 28 by a compression spring 38. When the solenoid valve 16 is energized, low pressure oil lifts the control valve 24 against the bias of spring 26 and then passes the ball check valve 34. A passageway 40 communicates between the control valve chamber 22 and a slave cylinder 42 located in the housing 10, while a second passageway 44 communicates between the slave cylinder 42 and a master cylinder 46, also located in the housing 10.

A slave piston 48 is mounted for reciprocatory motion within the slave cylinder 42. The slave piston 48 is biased by a compression spring 50 toward an adjusting screw 52 threaded into the housing 10. The adjusting screw 52 is locked in its adjusted position by a lock nut 54. The lower end of the compression spring 50 seats on a retainer plate 56 which is located in the slave cylinder 42 by a snap ring 58.

A master piston 60 is mounted for reciprocatory motion in the master cylinder 46 and is lightly biased in an upwardly direction (as shown in FIG. 1) by a leaf spring 62. The master piston 60 is located so as to register with the adjusting screw mechanism 64 of rocker arm 66. The rocker arm 66 is actuated by a pushtube 68. If the retarder is driven from the fuel injector cam, rocker arm 66 will be the fuel injector rocker arm and the pushtube 68 will be the fuel injector pushtube for the cylinder associated with slave piston 48. However, if the retarder is driven, for example, from an exhaust valve cam, then the rocker arm 66 and pushtube 68 will be the exhaust valve rocker arm and pushtube for a cylinder other than the one with which the slave piston 48 is associated.

The lower end of the slave piston 48 is adapted to contact an exhaust valve crosshead 70. The crosshead 70 is mounted for reciprocatory motion on a pin 72 affixed to the engine head 12 and is adapted to contact the stems 74 of the dual exhaust valves 76 which are biased toward the closed position by valve springs 78. The line 71 indicates the rest position of the crosshead 70 when the exhaust valves 76 are closed. During the powering mode of engine operation, the exhaust valves 76 are opened by the actuation of the exhaust valve rocker arm 80 which drives the crosshead 70 downwardly (as shown in FIG. 1) against the exhaust valve stems 74.

The electrical control circuit for the retarder comprises a conduit 82 which runs from the coil of the solenoid valve 16 to a three-position switch 84. Thereafter the circuit includes, in series, a fuel pump switch 86, a clutch switch 88, a manual or dash switch 90, a fuse 92, the vehicle battery 94 and a ground 96. Preferably, the switches 86, 88 and 90 are protected by a diode 98 which is grounded. It is convenient to use one solenoid valve 16 to actuate control valves 24 associated with one retarder housing. Thus the switch 84 enables the operator to retard two, four or six cylinders of a six-cylinder engine in case of a three housing unit as contemplated by FIG. 1 or three or six cylinders of a six cylinder engine in case of a two housing unit as contemplated by FIG. 1A. As shown in FIG. 1A, no separate manual switch 90 is required since the third position of the three position switch 84 functions as a manual "OFF" switch. The fuel pump switch 86 and the clutch switch 88 are automatic switches which ensure that the fuel supply is interrupted during retarding and that the retarder is turned off whenever the clutch is disengaged. The dash switch 90 enables the operator to deactive the system.

In operation, energizing of the solenoid 16 permits the flow of low pressure oil through the passageways 14 and 20 into the control valve chamber 22 and thence through passageways 40 and 44 into the slave cylinder 42 and master cylinder 46. Reverse flow of oil from the passageway 40 is prevented by the ball check valve 34 located in the control valve 24. Once the mechanism is filled with oil, upward motion (as shown in FIG. 1) of the master piston 60 as a result of the motion of the pushtube 68 will result in a corresponding downward motion (as shown in FIG. 1) of the slave piston 48. This, in turn, causes the exhaust valves 76 to open.

Referring to FIG. 2A which relates to a retarder mechanism driven from the fuel injector cam, it will be noted that significant motion of the fuel injector pushtube for Cylinder No. 1 begins at about 30° BTDC as the piston in Cylinder No. 1 is completing its compression stroke. Since a lash of about 0.018" is normally provided in the valve train mechanism (by means of the adjusting screw 52) the initial motion of the slave piston 48, shown by curve 100, will take up the lash so that the exhaust valve beings to open at about 25° BTDC and reaches its maximum opening just after TDC. Thus, the work done in compressing air during the compression stroke is not recovered during the ensuing expansion stroke. It may be observed that both the timing of the travel and the extent of the travel of the slave piston 48 are such that a relative large retarding horsepower can be developed by using an injector cam-driven mechanism.

FIG. 2B shows a typical exhaust valve motion produced during engine retarding when the motion is derived from a remote exhaust pushtube and exhaust cam. It will be noted that the slave piston travel, curve 102, begins sooner, ends later, travels farther and its rate of rise is lower than when the motion is derived from the injector cam, all of which are disadvantageous for purposes of driving the retarder. Also, when utilizing a remote exhaust cam, the exhaust valve travel must be limited to avoid interference between the exhaust valve and the engine piston at TDC. This may be accomplished by increasing the valve train lash from the usual value of about 0.018" to, for example, 0.070", as shown in FIG. 2B. An advantage of increasing the valve train lash is that the exhaust valve begins to open at a later time, e.g., about 55° BTDC, and thus the cylinder pressure can build to a higher level before the compression release event occurs. However, even when the exhaust cam operation is optimized it produces significantly less retarding horsepower than an injector cam-driven retarder. The ideal condition would be, of course, to let the cylinder pressure build to its maximum and then to open the exhaust valve instantaneously. Applicants provide a mechanism which approaches this ideal.

Figure 3:
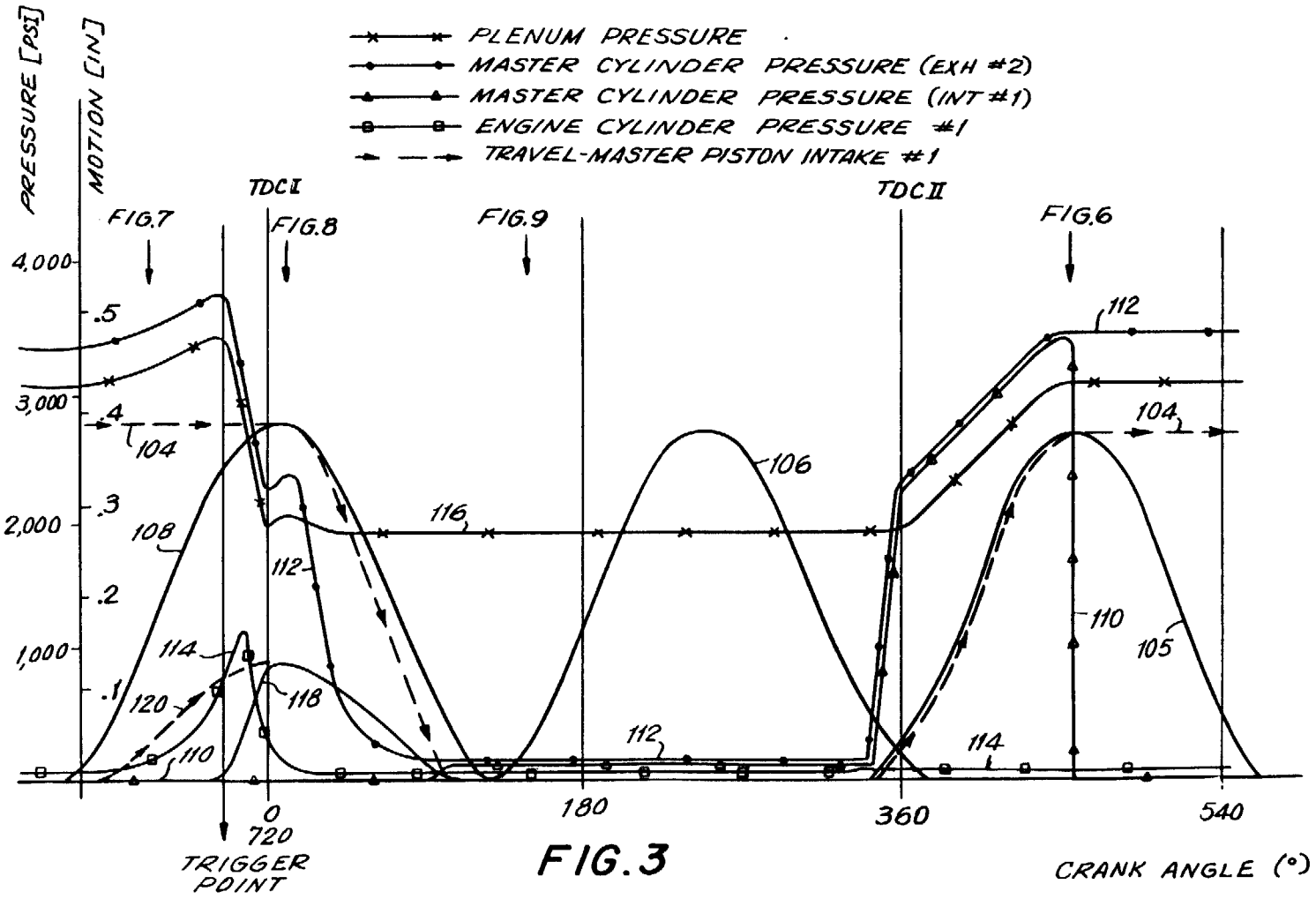
FIG. 3 is a diagram showing the motion of certain master pistons, the exhaust valve and the pressures at certain points in the mechanism of the present invention as a function of the crankangle for a complete engine cycle.

Reference is now made to FIG. 3 which illustrates, graphically, the result of applicants' method and apparatus. In FIG. 3 the ordinate is pressure or motion plotted against the crankangle position, as abscissa, where TDC I represents the top dead center position of the piston in Cylinder No. 1 following the compression stroke and TDC II represents the top dead center position of the piston in Cylinder No. 1 following the exhaust stroke. Curve 104 represents the motion of the master piston driven by the intake pushtube for Cylinder No. 1; curve 105 represents the motion of the intake pushtube for Cylinder No. 1; curve 106 represents the motion of the exhaust pushtube for Cylinder No. 1; and curve 108 represents the motion of the exhaust pushtube for Cylinder No. 2. Curve 110 shows the variation in the pressure above the master piston driven by the intake pushtube for Cylinder No. 1; curve 112 shows the variation in the pressure above the master piston driven by the exhaust pushtube for Cylinder No. 2; curve 114 shows the variation in the cylinder pressure in Cylinder No 1; and curve 116 shows the variation in the plenum pressure. Curve 118 shows the motion of the exhaust valve during engine retarding for Cylinder No. 1 resulting from the mechanism of the present invention while curve 120 shows the motion of the exhaust valve during engine retarding for Cylinder No 1 without the mechanism of the present invention.

Figures 4, 5:
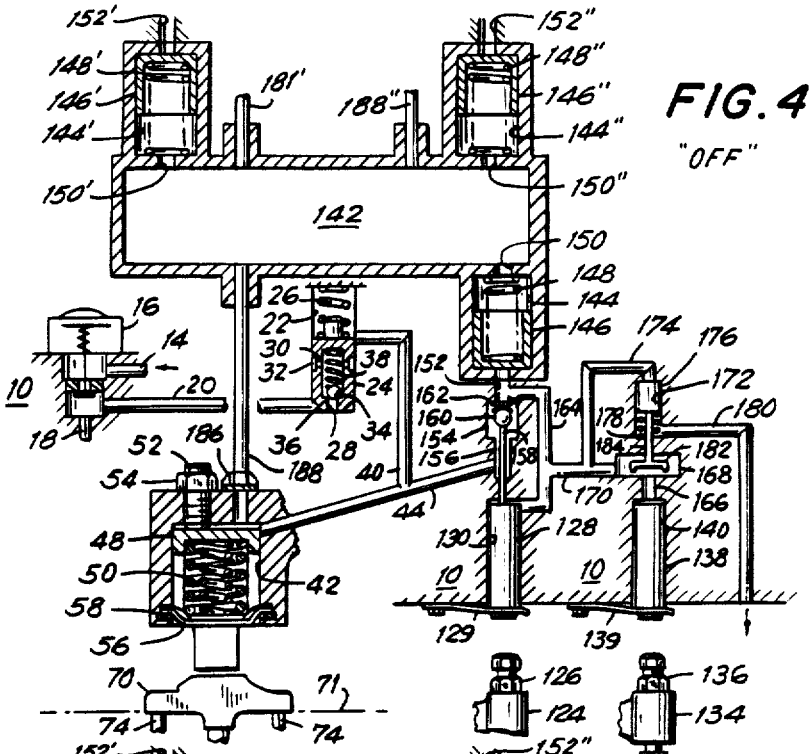
FIG. 4 is a schematic diagram of a compression release engine retarder in accordance with the present invention with the control switch in the "OFF" position.
FIG. 5 is a schematic diagram of a compression release engine retarder in accordance with the present invention with the control switch in the "ON" position.

Reference is now made to FIGS. 4–9 which show mechanism in accordance with the present invention in conjunction with the exhaust cam-driven retarder shown in FIGS. 1 and 2B. Components which are common to all Figures carry the same designation. FIG. 4 illustrates the condition of the mechanism when the compression retarding system has been shut off, e.g., the dash switch 90 (FIG. 1) or the three-position switch 84 (FIG. 1A) is in the "OFF" or open position. The mechanisms shown in FIGS. 4–9 are related to the exhaust valve for Cylinder No. 1. It will be understood that a similar mechanism is provided for each cylinder of the engine. For a six cylinder engine having the normal firing order 1-5-3-6-2-4 the relationship between the cylinders may be as shown in Table I below:

TABLE 1

| Driven Slave Piston | Driving Master Pistons: Exhaust Pushtube | Intake Pushtube Alternatives: A | B | C |
|---|---|---|---|---|
| 1 | 2 | 3 | 2 | 1 |
| 2 | 3 | 1 | 3 | 2 |
| 3 | 1 | 2 | 1 | 3 |
| 4 | 6 | 5 | 6 | 4 |
| 5 | 4 | 6 | 4 | 5 |
| 6 | 5 | 4 | 5 | 6 |

As the intake master pistons are used to pump up the pressure in the plenum, any of three alternatives shown in Table I may be employed based on preference and ease of manufacture without significantly affecting the performance. For simplicity of description, Alternative C will be referred to hereafter. The exhaust pushtube 122 for Cylinder No. 2 drives the exhaust rocker arm 124 for Cylinder No. 2 and, through the adjusting screw mechanism 126, the master piston 128 which reciprocates in the master cylinder 130 formed in the retarder housing 10. The master piston 128 is biased upwardly (as shown in FIGS. 4–9) by a light leaf spring 129. Similarly, intake pushtube 132 for Cylinder No. 1 drives the intake rocker arm 134 for Cylinder No. 1 and, through the adjusting screw mechanism 136, the master piston 138 which reciprocates in the master cylinder 140 also formed in the retarder housing 10. The master piston 138 is biased in an upwardly direction (as shown in FIGS. 4–9) by a light leaf spring 139.

A plenum chamber 142 is formed in the retarder housing 10. The plenum chamber 142 may have any desired shape provided that its volume is large enough to absorb, temporarily, at a reasonable pressure, energy delivered from the fuel travel of the intake master piston and a partial travel of the exhaust master piston sufficient to open the exhaust valve against the cylinder pressure within two engine cycles. The plenum size is determined by the bulk modulus of the working fluid, in this case, engine lubricating oil. For an engine having a displacement of about 2.35 liters per cylinder, applicants have found that a plenum volume of about 10 cubic inches is sufficient to service three cylinders. Thus, a standard six cylinder engine may conveniently be provided with two retarder housings 10, each housing having a 10 cubic inch plenum 142.

For each engine cylinder it services, the plenum 142 is provided with a driving cylinder 144 within which a free piston 146 may reciprocate against the bias of a compression spring 148. The cylinder 144 communicates with the plenum 142 through passageway 150. A passageway 152 communicates between the driving cylinder 144 and a trigger check valve 154 which controls flow through passageway 156 which, in turn, connects with passageway 44. Passageway 156 is aligned with, but is isolated from, the master cylinder 130. A pin 158 passing through a lap fit seal in the housing 10 contacts the end of master piston 128 and passes axially through the passageway 156. Pin 158 is of sufficient length to displace the trigger check valve ball 160 against the bias of the spring 162 and the pressure in the passageway 152 when the master piston 128 approaches the upper limit of its travel within the master cylinder 130. A bypass 164 communicates between the master cylinder 130 and passageway 152.

A passageway 166 communicates between the master cylinder 140 and a control check valve chamber 168 which, in turn, communicates with the bypass 164 through passageway 170. Control check valve cylinder 172 communicates with passageway 170 through passageway 174. Control check valve piston 176 reciprocates within the control check valve cylinder 172 and is biased toward the upward (as viewed in FIGS. 4–9) or open position by a compression spring 178. The control check valve cylinder 172 is vented through duct 180. Control check valve 182 is located in the control check valve chamber 168 and connected to the control check valve piston 176 by a rod 184 passing through a lap fit seal in the housing 10.

Slave cylinder 42 communicates with the plenum 142 through a check valve 186 and a passageway 188. Check valve 186 permits flow only from the slave cylinder 42 toward the plenum 142.

It will be understood that mechanisms like those shown connected to passageways 188 and 152 for Cylinder No. 1 are connected to passageways 188' and 152' for Cylinder No. 2 and to passageways 188'' and 152'' for Cylinder No. 3. A duplicate system services Cylinders 4, 5 and 6.

The operation of the system will now be explained by sequential reference to FIGS. 4 through 9. As noted, FIG. 4 represents the "off" position in which the solenoid valve 16 is closed and the oil in the system (other than the plenum) is vented to the engine sump. Thus, no oil pressure exists beyond the solenoid valve 16; the control valve 24 is in the "down" (as viewed in FIG. 4) or closed position; trigger check valve 154 is held open; control check valve 182 is open, the slave piston 48 rests against the stop 52 and the master pistons 128 and 138 are biased away from the adjusting screw mechanisms 126 and 136. It will be appreciated that the retarding mechanism is out of contact with the operating parts of the engine so that the engine, in its operating mode, is entirely unaffected by the retarder mechanism.

FIG. 5 shows the condition of the mechanism when the retarder is turned to the "on" position. In this mode, the solenoid valve 16 opens and low pressure oil flows from passageway 14 into passageway 20 and then into the control valve chamber 22 thereby raising the control valve 24 so that the circumferential groove 32 registers with passageway 40. Oil then flows past the ball check valve 34, through passageways 40 and 44 into the slave cylinder 42 and through the check valve 186 and passageway 188 into the plenum 142. Also, oil flows through passageways 44 and 156, past the trigger check valve ball 160 and into the master cylinders 130 and 140, causing the mater pistons 128 and 138 to extend downwardly (as viewed in FIG. 5) to contact the adjusting screw mechanisms 126 and 136. It will be understood that while the low pressure oil may fill the system, the pressure is insufficient to cause any motion of the slave piston 48 or the driving piston 146.

Figure 6:
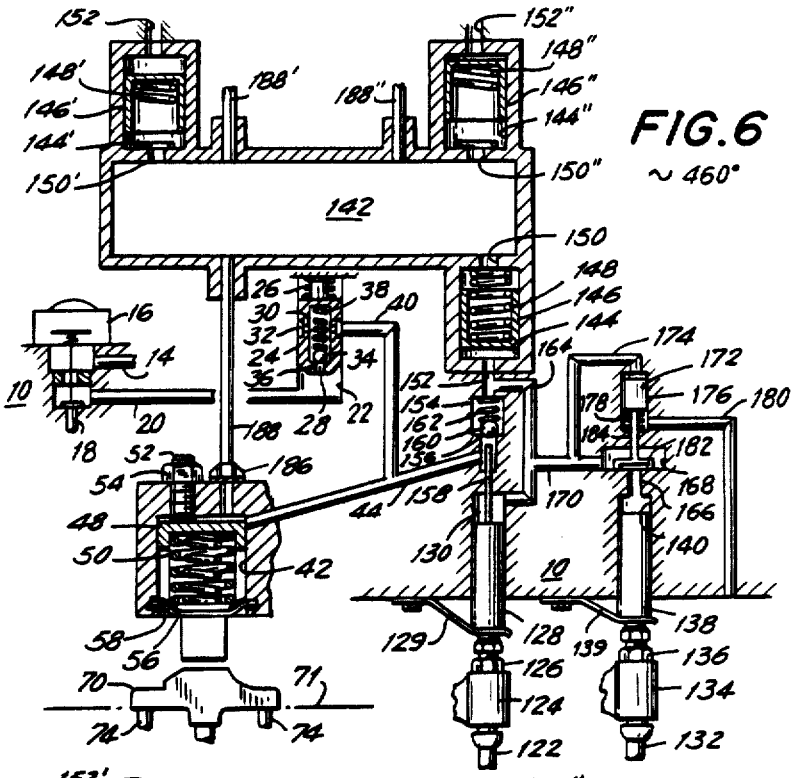
FIG. 6 is a schematic diagram of a compression release engine retarder in accordance with the present invention showing the conditions prevailing during the upward travel of the intake master piston (about 460 crankangle degrees).

Reference will now be made to FIG. 6 which shows the conditions occurring at the peak of the upward motion of the intake pushtube 132 for Cylinder No. 1 (about 460°; see FIG. 3). As the intake pushtube 132 moves upwardly (as viewed in FIG. 6) the master piston 138 is driven into the master cylinder 140 and oil is forced through passageway 166, past control check valve 182 and into the control check valve chamber 168. The control check valve 182 remains in the open position (as shown in FIG. 5) until the pressure in the control check valve chamber 168 reaches about 1,000 psi. At this point, the control check valve 182 closes (as shown in FIG. 6) and functions as a check valve. The pressure of the oil in the bypass 164 and the trigger check valve 154 assures that the trigger check valve ball 160 is seated and that the oil passes through passageway 152 and into the driving cylinder 144 so as to move the free piston 146 against the bias of spring 148 thereby rapidly increasing the pressure of the oil in the plenum 142.

Figure 7:
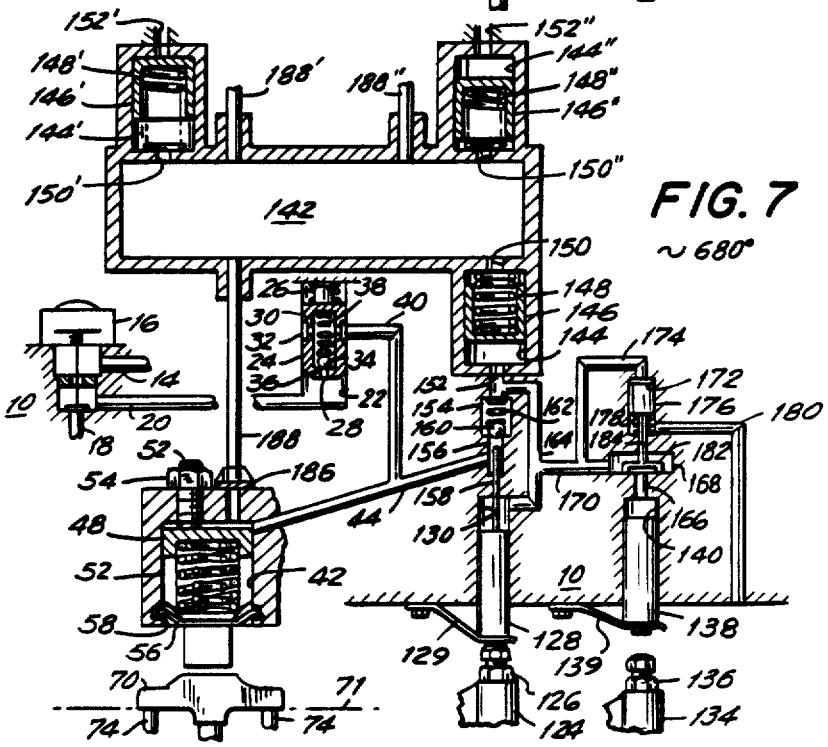
FIG. 7 is a schematic diagram of a compression release engine retarder in accordance with the present invention shown the conditions prevailing during the upward travel of the exhaust master piston (about 650 crankangle degrees).

Reference is now made to FIG. 7 which shows the events which occur at about 680° crankangle position during a portion of the upward movement (as viewed in FIG. 7) of exhaust pushtube 122 for Cylinder No. 2. As the exhaust pushtube 122 is driven upwardly, it, in turn, drives the master piston 128 upwardly (as viewed in FIG. 7) and forces oil from the master cylinder 130 into the bypass 164, the passageway 152, the trigger check valve 154 and the driving cylinder 144. The resulting upward movement (as viewed in FIG. 7) of the free piston 146 causes the pressure to rise further in the plenum 142.

At a predetermined point in the travel of master piston 128, the pins 158 contacts the trigger check valve ball 160 and forces it away from its seat. This event may occur, for example, at about 695° crankangle position. When the trigger check valve 154 is opened, a volume of high pressure oil will be delivered rapidly through passageways 156, 44, and 40 to the slave cylinder 42 (see FIG. 8). If the amount of energy is sufficiently high to drive the slave piston 48 downwardly (as viewed in FIG. 8), the exhaust valve crosshead 70 will be actuated so as to open the exhaust valves near TDC I and thereby produce a compression release event. If, on the other hand, the retarder has just been turned on and the pressure in the plenum chamber 142 is relatively low, the oil delivered from the driving cylinder 144 will pass through check valve 186 and passageway 188 and be delivered to the plenum chamber 142. The oil so delivered, together with any leakage, will be replaced through the control valve 24 beginning during return motion of the exhaust pushtube 122 for Cylinder No. 2 and the corresponding downward motion of master piston 128 and ending shortly before 360° crankangle position when intake pushtube 132 for Cylinder No. 1 is again actuated. This latter condition is illustrated in FIG. 9 which shows the slave piston 42 in its rest position against the stop 52, trigger check valve ball 160 seated, and master pistons 128 and 138 in their lowermost or extended positions.

Figure 8:
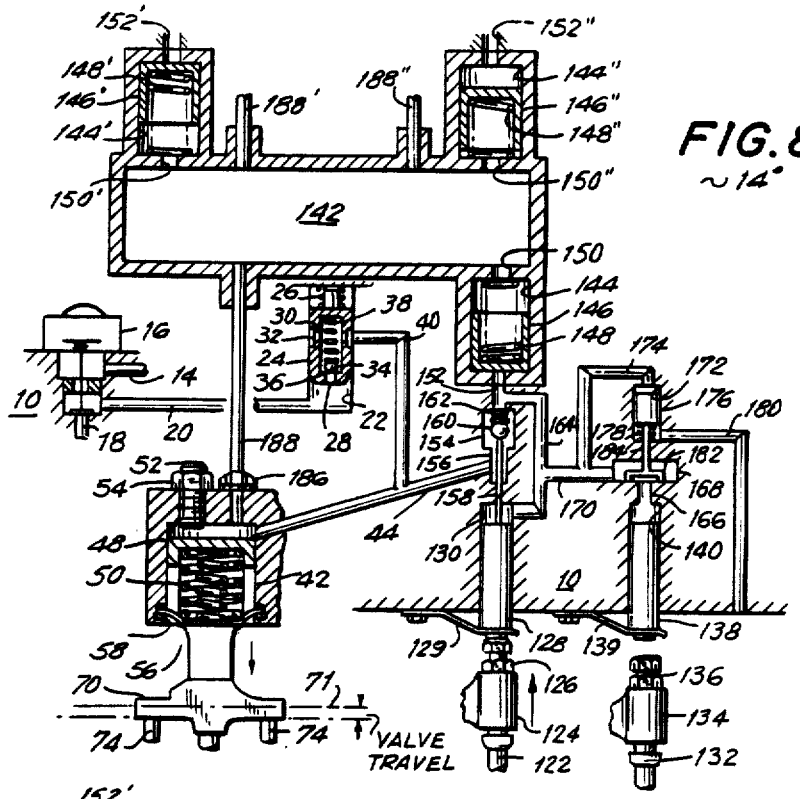
FIG. 8 is a schematic diagram of a compression release engine retarder in accordance with the present invention showing the conditions prevailing during the initial part of the compression release event (about 14 crankangle degrees).
Figure 9:
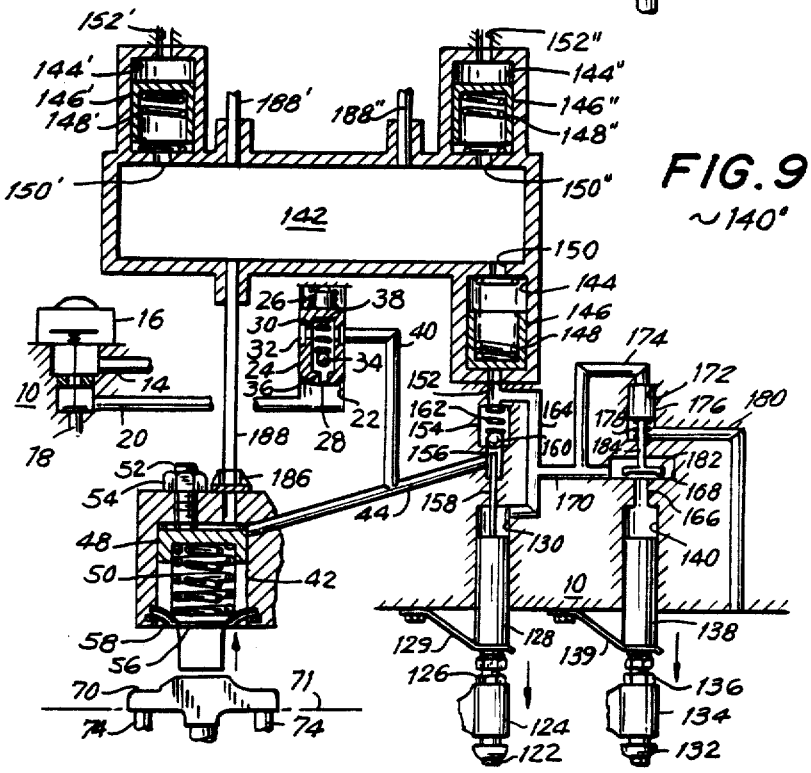
FIG. 9 is a schematic diagram of a compression release engine retarder in accordance with the present invention showing the conditions prevailing at the end of the retarding cycle (about 140 crankangle degrees).

It will be noted in FIGS. 7 and 8 that the control check valve 182 remains closed and the master piston 138 remains in the upward position even though the pushtube 132 has retracted. The areas of control check valve 182 and piston 176 are coordinated with the spring rate of compression spring 178 so that whenever the pressure in passageways 170 and 174 rises above about 1,000 psi the control check valve 182 will close and will remain closed so as to function as a check valve until the pressure drops below about 400 psi. This design limits the oil introduced into the system to the amount required to attain a pressure sufficient to drive the slave piston 48 downwardly and thereby open the exhaust valve, plus leakage. Oil which make leak pass the slave piston 48 or the master pistons 128 and 138 is returned to the engine sump along with oil used to lubricate the rocker arm assembly. Oil which may leak past the piston 176 and rod 184 is vented to the rocker arm region through vent duct 180. Oil release from the system over the control valve 24 when the system is turned off returns to the sump through duct means (not shown).

It will be understood that the pressure rise in the plenum 142 during each engine cycle depends upon the displacement of the master pistons 128 and 138 and the volume of the plenum 142. More particularly, the increase in plenum pressure may be determined by the formula:

$$\Delta p = \frac{\Delta V}{V} \beta$$

Where $\Delta p$ = Plenum pressure rise (psi)

$\Delta V$ = Volume of oil displaced by master pistons (in.$^3$)

$V$ = System volume (plenum volume plus volume of related passages)(in.$^3$)

$\beta$ = Bulk Modulus of oil (approx. 200,000 psi for engine oil)

Also, the pressure drop during a compression release event depends on the volume of the plenum. A large plenum will require a number of engine cycles in order to attain its operating pressure level, but will maintain a more nearly constant pressure level during operation. As noted above, applicants have found a 10 cubic inch plenum adequate to service three cylinders of a 12 to 14 liter six cylinder engine. In this arrangement, operating plenum pressure can be attained within two engine cycles. It will be understood that applicants have utilized the compliance of the oil contained in the system, and, particularly in the plenum, to absorb and release the energy delivered by the master pistons.

Referring to FIG. 3 it will be noted that the compression release exhaust valve opening (curve 118) is triggered just before TDC I by the opening of the trigger check valve 154 and is evidenced by a drop in plenum pressure (curve 116) or pressure above the exhaust master piston 128 (curve 112). Since the motion of the master piston 128 is precisely determined by the exhaust cam for Cylinder No. 2, the timing of the opening of the trigger check valve 154 is determined by the length of the pin 158. Thus, the timing of the compression release event is fully controllable by the designer. Moreover, the rate at which the exhaust valve opens depends on the amount of energy delivered from the driving cylinder 144 and is independent of the shape of the injector, exhaust or intake cam which may thus be designed to best accommodate its primary function. However, because the exhaust valve may now be opened very rapidly and at any desired time, the retarding horsepower can be maximized for a given set of engine conditions.

Tests on a six cylinder 14 liter engine equipped with a conventional exhaust cam-driven retarder produced 275 horsepower at an engine speed of 2100 RPM. When this retarder was modified to test the concepts of the present invention, the retarding horsepower was increased by over 100 horsepower at the same engine speed.

Figure 10:
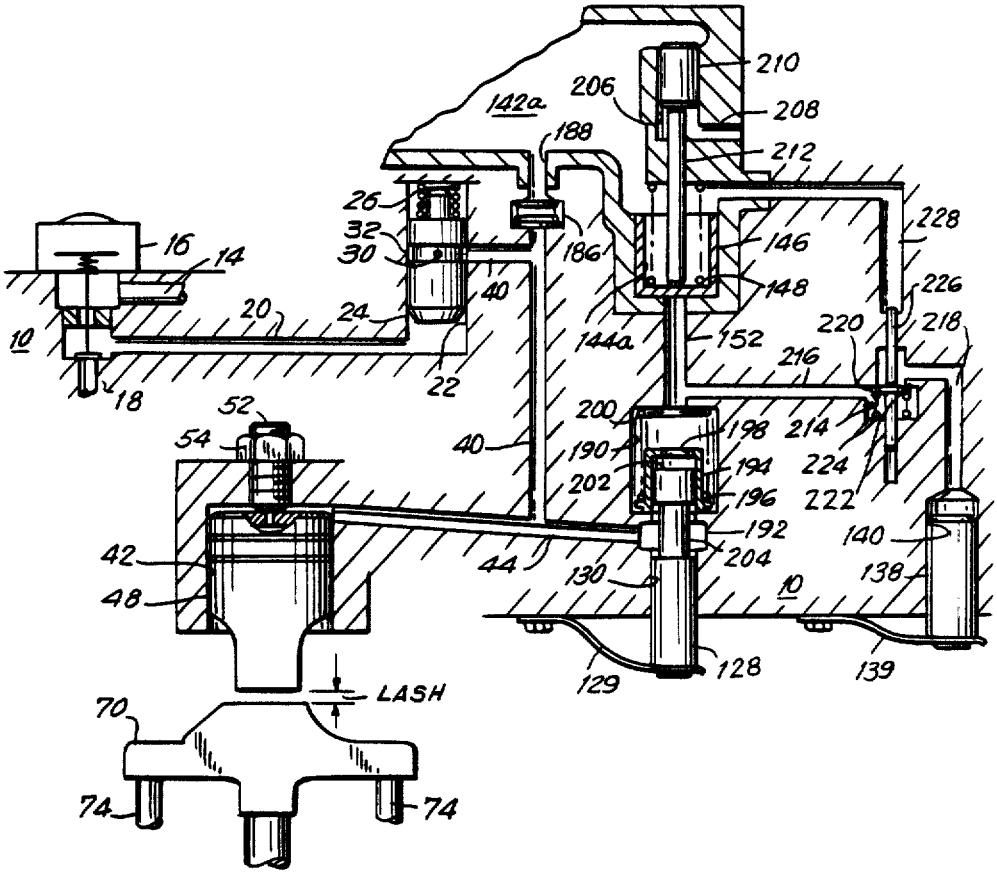
FIG. 10 is a fragmentary diagram of a modified form of an engine retarder in accordance with the present invention incorporating a modified trigger check valve and a modified control check valve.

Reference is now made to FIG. 10 which illustrates in schematic form, a modification of the trigger and control check valve mechanisms. To the extent that the parts in FIG. 10 are also shown in FIGS. 4–9, the same designators will be used and the earlier description will not be repeated. Modified parts will be designated by a subscript (a).

The trigger check valve mechanism comprises a cavity 190 formed in the housing and communicating at one end with the master cylinder 130 and at the other end with passageway 152. The master cylinder 130 is formed with an annular cavity 192 which communicates with passageway 44 and permits a flow past the master piston 128 when that piston is in its uppermost position as viewed in FIG. 10. A tubular valve element 194 having a rim 196 at its open end and a hole 198 at the opposite end is biased toward the bottom of the cavity 190 by a compression spring 200. The compression spring 200 is positioned between the top of the cavity 190 and the rim 196 of the tubular valve element 194. A piston 202 is adjustably mounted on one end of a connecting rod 204 for reciprocating movement within the tubular valve element 194. The opposite end of the connecting rod 204 is fixed to the master piston 128. It will be appreciated that the piston 202 and tubular valve element 194 function as a valve which opens whenever the master piston 128 moves far enough in an upward direction so that the piston 202 raises the tubular valve element 194 off its seat against the bias of compression spring 200 and the pressure within the cavity 190. Until the tubular valve element 194 is lifted from its seat, motion of the master piston 128 and piston 202 pump hydraulic fluid from the cavity 190 through passageway 152 and into driving cylinder 144a.

A firing cylinder 206 is formed within the plenum 142a coaxially with the driving cylinder 144a. The firing cylinder 206 is vented through passageway 208. A firing piston 210 is mounted for reciprocatory motion in the firing cylinder 206 and is spaced from the free piston 146 by a drive pin 212 which passes through a lap fit seal in the wall of the plenum 142a.

A check valve chamber 214 is formed in the housing 10 and communicates with passageway 152 through passageway 216 and with the intake master cylinder 140 through passageway 218. Check valve 220 is biased toward a seat 222 formed in the check valve chamber 214 by a compression spring 224. The check valve 220 is mounted on a guide pin 226 which passes through a lap fit seal in the housing 10. One end of the guide pin 226 extends into passageway 228 which communicates with the plenum 142a. It will be noted that the pressure in the plenum 142a is applied to each side of the check valve 220, but that pressure is applied to different areas. As will be apparent, the pressure exerted through passageway 216 is applied to the area of the check valve 220 while the pressure exerted through passageway 228 is applied to the much smaller area of the guide pin 226. It will also be observed that when the free piston 146 is seated against the end of the driving cylinder 144a communicating with passageway 152, the pressure in passageways 152 and 216 may be substantially less than the pressure in the plenum 142a.

The operation of the mechanism shown in FIG. 10 is substantially like that of the mechanism shown in FIGS. 4–9. When the retarder is in the "OFF" position, the check valve 220 will be held open so long as the pressure in the plenum 142a exceeds the pressure is passageway 152. Additionally, since the control valve 24 is in the "down" position (as shown in FIG. 4) the pressure in passageways 40, 44, 152 and 216 will be released and the master piston 128 will return to its uppermost position thereby holding tubular valve element 194 in the open position.

When the retarder is turned on by energizing the solenoid valve 16, hydraulic fluid will be pumped at low pressure through passageways 40 and 44 and into master cylinder 130, cavity 190, passageways 152 and 216, check valve chamber 214, passageway 218 and master cylinder 140. When master cylinder 130 is filled, the tubular valve element 194 will seat.

At about 360 crankangle degrees, the intake valve pushtube for Cylinder No. 1 begins to drive master piston 138 upwardly (as shown in FIG. 10) so as to apply pressure to passageways 216 and 152, cavity 190 and free piston 146. When the pressure due to the motion of master piston 138 exceeds the pressure in the plenum 142a, the free piston 146 will be displaced upwardly. When master piston 138 stops its upward movement at about 450°, the check valve 220 will remain closed, thereby maintaining the pressure in cavity 190.

At about 630 crankangle degrees, the exhaust pushtube for Cylinder No. 2 begins to drive master piston 128 upwards (as shown in FIG. 10) thereby further pressurizing the cavity 190 and driving free piston 146 further in an upward direction. It will be understood that upward motion of the free piston 146 results in an increase in the pressure within the plenum 142a.

At a predetermined point, which may be, for example, about 695 crankangle degrees, piston 202 driven by the master piston 128 lifts the tubular valve element 194 from its seat thereby permitting the pressure energy stored in the plenum 142a and the high pressure fluid under the free piston 146 to be delivered rapidly through passageway 44 to the slave cylinder 42. If the fluid pressure is high enough to overcome the engine cylinder pressure and the bias of the valve springs 74, the slave piston 48 will drive the crosshead 70 downwardly against the valve stems 74 so as to open the exhaust valves 76. If the fluid pressure is insufficient to open the engine exhaust valve, the hydraulic fluid will be pumped through check valve 186 into the plenum 142a. It will be appreciated that a small addition of hydraulic fluid to the plenum 142a will result in a substantial pressure rise in the plenum 142a during the ensuing cycle.

Consideration of the mechanism shown in FIG. 10 will reveal that although the lifting of the tubular valve element 194 signals the beginning of the valve opening event, the rate at which the slave piston moves downwardly is controlled by the rate at which the free piston 146 moves downwardly. The rate of motion of free piston 146 is proportional to the net downward force acting upon the piston 146. Since the fluid pressure on each side of the free piston 146 and the areas against which it acts are substantially equal, the net force available to drive the free piston 146 downwardly is substantially equal to the spring rate of compression spring 148. Although it is desirable to maximize the rate of spring 148, there are physical constraints in the apparatus which limit the spring rates which may be employed. In order to increase the net downward force available to accelerate the free piston 146, applicants provide firing piston 210 and drive pin 212. It will be seen that the additional force acting downwardly on the free piston 146 is proportional to the difference between the cross-sectional areas of the firing piston 210 and the drive pin 212.

Figure 11A:
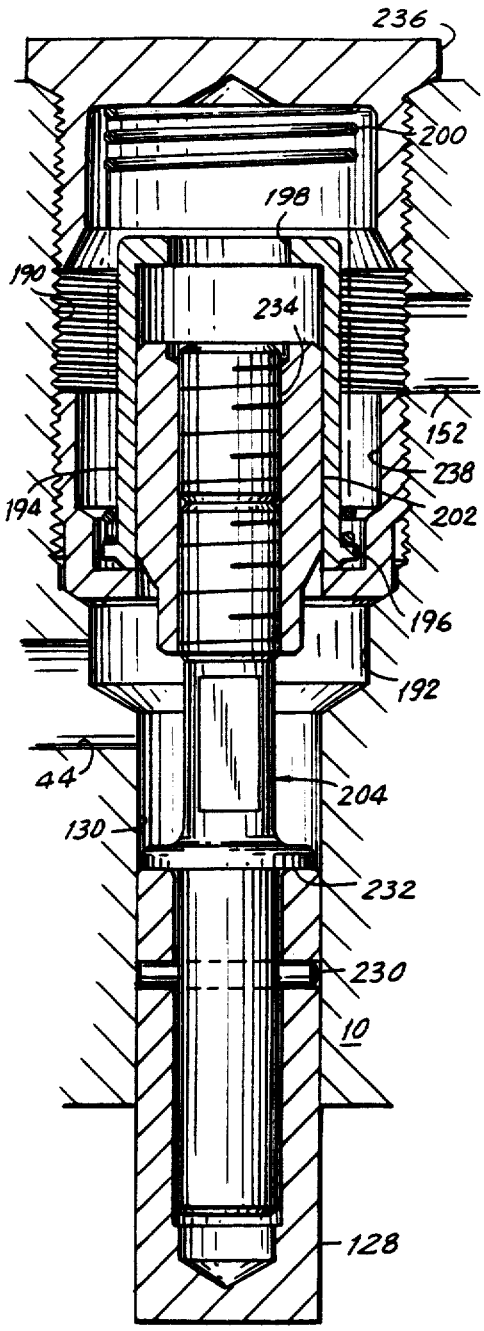
FIG. 11A is a cross-sectional view of the modified trigger check valve shown in FIG. 10 in its unactuated position.
Figure 11B:
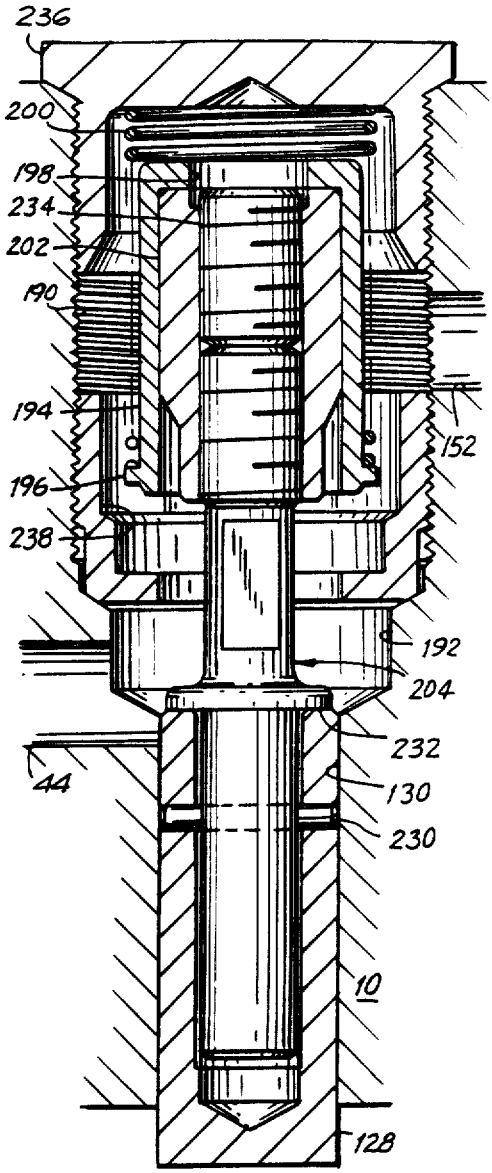
FIG. 11B is a cross-sectional view of the trigger check valve of FIG. 11A in its actuated position.

FIGS. 11A and 11B show additional details of the construction of the trigger check valve shown schematically in FIG. 10; FIG. 11A shows the mechanism at the beginning of the stroke of the master piston 128 while FIG. 11B shows the mechanism at the end of the stroke of the master piston 128. Connecting rod 204 may be affixed to the master piston 128 by a pin 230 and is provided with a shoulder 232 adjacent the upper end of the master piston 128. The upper end of the connecting rod 204 is threaded to receive the adjustable piston 202. The piston 202 is locked into its adjusted position on the connecting rod 204 by a set screw 234. The piston 202 reciprocates within a tubular valve element 194 which is biased in a downwardly direction (as shown in FIGS. 11A and 11B) by a compression spring 200 mounted between the rim 196 of the tubular valve element 194 and a cap 236 which is threaded into the cavity 190. A valve seat 238 is also threaded into the cavity 190 adjacent to an enlarged portion 192 of the master cylinder 130. Passageway 44 communicates with the enlarged portion of the master cylinder 130 while passageway 152 communicates with the cavity 190 in the region between the bottom of the cap 236 and the top of the valve seat 238.

It will be seen that compression spring 200 normally biased the tubular valve element 194 against the valve seat 238 so that piston 202 can pump hydraulic fluid through the hole 198, the cavity 190 and passageway 152. When the piston 202 lifts the tubular valve element 194 away from the valve seat 238, reverse flow of hydraulic fluid from passageway 152 through cavity 190 to passageway 44 occurs. Timing of the opening of the tubular valve element 194 may be controlled by adjusting the piston 202 relative to the connecting rod 204.

Figure 12:
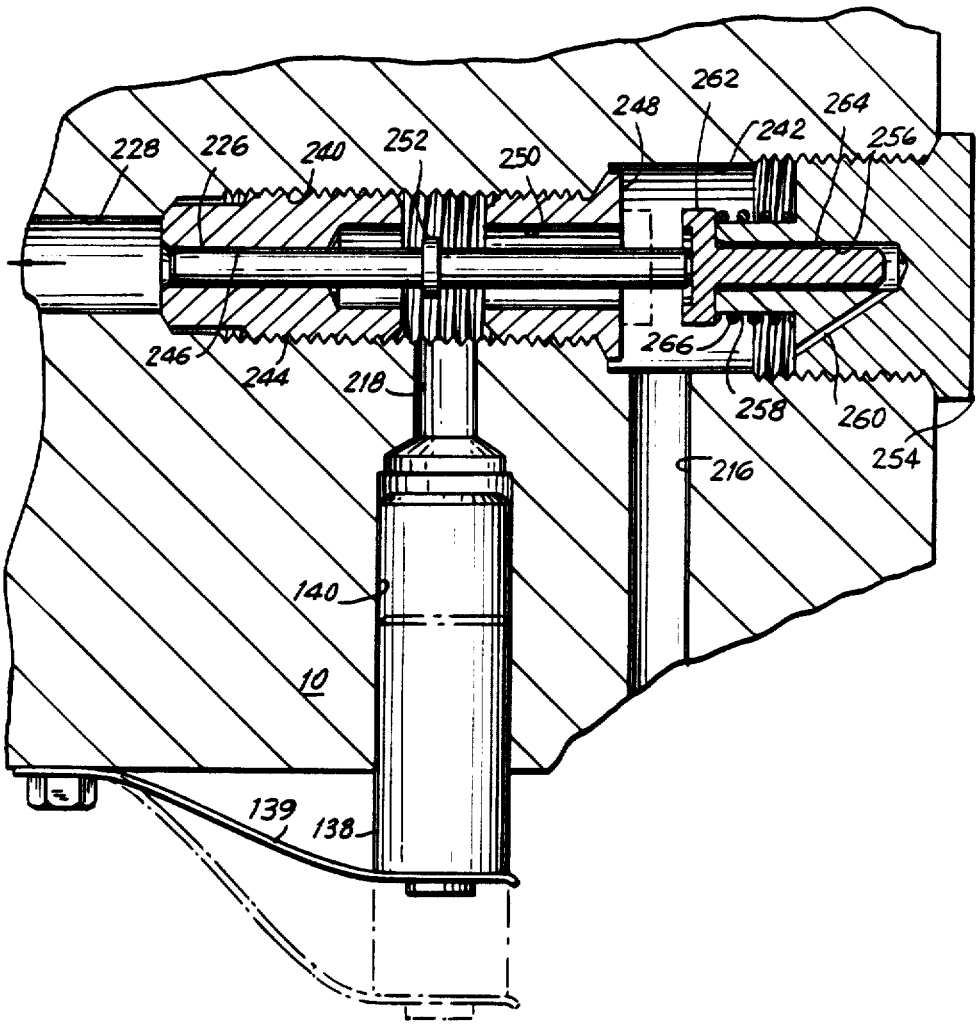
FIG. 12 is a cross-sectional view showing, in more detail, the modified control check valve indicated in FIG. 10.

FIG. 12 shows, in more detail, the preferred check valve shown schematically in FIG. 10 which is associated with the intake master piston 138.

Passageway 228 which leads to the plenum 142a contains an enlarged threaded bore 240 which communicates with passageway 218, master cylinder 140 and master piston 138. A further enlarged threaded bore 242 communicates axially with bore 240 and radially with passageway 216 which, through passageway 152 (FIG. 10), communicates with the driving cylinder 144a and the trigger check valve. A bushing 244 having an axial bore 246 is threaded into the bore 240. A lapped fit is provided between the guide pin 226 and the bore 246. A valve seat 248 having an axial bore 250 is threaded into the bore 240. Preferably, a collar 252 is formed on the guide pin 226 to limit its axial travel in a direction toward the plenum 142a. A valve retaining cap 254 having an axial blind bore 256 and an axial boss 258 is threaded into the further enlarged bore 242. A relief passage 260 communicates between the bottom of the blind bore 256 and an inner surface of the valve retaining cap 254.

A check valve 262 having a support pin 264 is mounted for reciprocating movement in the bore 256 of the retaining cap 254. A light compression spring 266 biases the valve 262 toward the valve seat 248 while plenum pressure is passageway 228 urges the guide pin 226 in a direction to move the check valve 262 away from the valve seat 248. Upward motion of the intake master piston 138 also tends to move the check valve 262 away from the valve seat 248.

Whenever the intake master piston 138 is driven upwardly (as shown in FIG. 12) and the pressure delivered by the master piston exceeds the plenum pressure, hydraulic fluid passes through the bore 250 of the valve seat 248, displaces the check valve 262 and flow through passageway 216 towards the driving cylinder 144a (FIG. 10). Under these circumstances, check valve 262 functions as an ordinary check valve.

As master piston 138 attains its full stroke and begins its return stroke, the pressure in bore 250 and passageway 218 drops and the check valve 262 is held against its seat 248 against the bias of the plenum pressure acting on the end of guide pin 226. It will be noted that the area of the check valve 262 upon which the pressure from the driving cylinder 144a acts is larger than the cross-sectional area of the guide pin 226 which is exposed to the plenum pressure. Thus, the force tending to close the check valve 262 will be larger than the force from the guide pin 226 tending to open the check valve. If, for example, the ratio of the cross-sectional areas of the check valve 262 and guide pin 226 is 7 and the plenum pressure is 3,500 psi, the check valve 262 will open whenever the pressure in passageway 216 and bore 242 falls below 500 psi. For this calculation, the force due to compression spring 266 has been neglected since it is relatively small. It will be understood that when the check valve 262 is opened, hydraulic fluid may flow back into master cylinder 140 to prepare it for the next cycle of operation.

While the description has proceeded to the present principally with respect to the improvement of an exhaust pushtube-actuated retarder, it will be appreciated that the principles herein outlined are equally applicable to an injector pushtube-actuated retarder. However, when applied to an injector pushtube-driven retarder the improvement in performance will be less dramatic because the characteristics of the injector cam are more favorable for retarding purposes than those of the exhaust cam.

In U.S. Pat. Nos. 4,572,114 and 4,592,319, retarding processes and apparatus are disclosed for producing two compression release events per cylinder per engine cycle, i.e., one compression release event per cylinder per crankshaft revolution. The invention disclosed herein may also be used in conjunction with the inventions disclosed in the above-cited patent and patent application. Considering a six cylinder engine having the usual firing order 1-5-3-6-2-4, a retarding system providing two compression release events per engine cycle may be arranged as set forth in Table II below:

TABLE II

| Retarded Cylinder | First Compression Release | Second Compression Release | Pump |
|---|---|---|---|
| 1 | Injector #1 | Exhaust #5 | Intake #1 |
| 5 | Injector #5 | Exhaust #3 | Intake #5 |
| 3 | Injector #3 | Exhaust #6 | Intake #3 |
| 6 | Injector #6 | Exhaust #2 | Intake #6 |
| 2 | Injector #2 | Exhaust #4 | Intake #2 |
| 4 | Injector #4 | Exhaust #1 | Intake #4 |

For engines having no fuel injector cam or pushtube an arrangement as set forth below in Tables III or IV is feasible:

TABLE III

| Retarded Cylinder | First Compression Release | Second Compression Release |
|---|---|---|
| 1 | Exhaust #2 | Intake #4 |
| 5 | Exhaust #4 | Intake #1 |
| 3 | Exhaust #1 | Intake #5 |
| 6 | Exhaust #5 | Intake #3 |
| 2 | Exhaust #3 | Intake #6 |
| 4 | Exhaust #6 | Intake #2 |

TABLE IV

| Retarded Cylinder | First Compression Release | Second Compression Release |
|---|---|---|
| 1 | Intake #3 | Exhaust #5 |
| 5 | Intake #6 | Exhaust #3 |
| 3 | Intake #2 | Exhaust #6 |

TABLE IV-continued

| Retarded Cylinder | First Compression Release | Second Compression Release |
|---|---|---|
| 6 | Intake #4 | Exhaust #2 |
| 2 | Intake #1 | Exhaust #4 |
| 4 | Intake #5 | Exhaust #1 |

It will be noted that in Tables III and IV no master cylinder and piston is provided to perform the pumping function of master cylinder 140 and master piston 138 in FIGS 4–9. In order to meet the pumping requirements of the system the master cylinders and pistons associated with the exhaust and/or intake pushtubes may be increased in diameter. This, of course, will cause an increase in the pushtube loading and care must be taken not to exceed the design load limits for these components.

For purposes of clarity and simplicity, the above description has been based on a six cylinder engine having a firing order 1-5-3-6-2-4. Other firing orders may be encountered as well as engines having differing numbers of cylinders. The present invention may be applied to such engines by identifying a pushtube or rocker arm the motion of which occurs during the compression stroke of the cylinder to be retarded; identifying a second pushtube or rocker arm the motion of which occurs during the exhaust stroke of the cylinder to be retarded (if two compression release events per engine cycle are desire); and/or identifying a third pushtube or rocker arm the motion of which can be utilized to provide pumping (if a separate pumping action is desired). Properly sized master pistons may then be provided for each of the identified pushtubes and the system interconnected as shown, for example, in FIGS. 4–9.

The terms and expressions which have been employed are used as terms of description and not of limitation and there is no intention in the use of such terms and expressions of excluding any equivalents of the features shown and described or portions thereof but it is recognized that various modifications are possible within the scope of the invention claimed.

What is claimed is:

1. In an engine retarding system of a gas compression release type including an internal combustion engine having a pressurized lubricating oil system, intake valve means, exhaust valve means, and pushtube means associated with each of said intake valve means and exhaust valve means, hydraulically actuated slave piston means associated with said exhaust valve means to open said exhaust valve means at a predetermined time, control valve means and solenoid valve means communicating in series with said pressurized lubricating oil system and said hydraulically actuated slave piston means, the improvement comprising plenum means communicating with said slave piston means, first check valve means located between said slave piston means and said plenum means to permit flow of hydraulic fluid only from said slave piston means into said plenum, driving cylinder means communicating with said plenum, free piston means having first and second ends mounted for reciprocatory motion in said driving cylinder means, spring means biasing said free piston means outwardly from said plenum, said free piston communicating on said first end with said plenum means, first master cylinder means aligned with said exhaust valve pushtube means and communicating with said second end of said free piston means, first master piston means mounted for reciprocatory motion in said first master cylinder means and adapted to be driven by said exhaust valve pushtube means, trigger check valve means aligned with said first master piston means and communicating between said slave piston means and said second side of said free piston means to permit flow of hydraulic fluid from said slave piston means toward said free piston means, means contacting said first master piston means and adapted to open said trigger check valve means at a predetermined point during the travel of said first master piston means, second master cylinder means aligned with said intake valve pushtube means, second master piston means mounted for reciprocatory motion in said second master cylinder means and adapted to be driven by said intake valve pushtube means, and control check valve means communicating between said second end of said free piston means and said second master cylinder means.

2. An engine retarding system as described in claim 1 wherein said control check valve means comprises a control check valve cylinder communicating with said first master cylinder, a control check valve piston mounted for reciprocatory motion in said control check valve cylinder, a control check valve affixed to said control check valve piston and adapted to move between a first open position and a second checking position, biasing means located in said control check valve cylinder adapted to bias said control check valve piston and said control check valve toward the open position.

3. An engine retarding system as described in claim 2 wherein said biasing means maintains said control check valve in said first open position until a first predetermined pressure is attained at said second end of said free piston means and thereafter maintains said control valve in said second checking position until the pressure at said second end of said free piston means drops below a second predetermined pressure which is less than said first predetermined pressure.

4. An engine retarding system as described in claim 1 wherein said control check valve means comprises a control check valve adapted to move between a first open position and a second checking position, said control check valve biased toward said second checking position by the pressure communicated from said second end of said free piston means, said control check valve biased toward said first open position by the pressure communicated from said plenum means.

5. An engine retarding system as described in claim 4 wherein the pressure communicated from said second end of said free piston means acts upon a larger area of said control check valve than the area of said control check valve acted upon by the pressure communicated from said plenum means whereby said control check valve is maintained in said first open position until a first predetermined pressure is attained at said second end of said free piston means and thereafter said control check valve is maintained in said second checking position until the pressure at said second end of said free piston means drops below a second predetermined pressure which is less than said first predetermined pressure.

6. An engine retarding system as described in claim 5 wherein the pressure communicated from said plenum means to said control check valve is communicated by an axially movable pin member exposed on a first end to the pressure existing in said plenum means and on a second end to said control check valve.

7. An engine retarding system as described in claim 1 wherein said trigger check valve comprises a valve chamber, a tubular valve element having a seat at a first end and a discharge hole at a second end, spring means biasing said tubular valve element towards a seated position in said valve chamber, said tubular valve element having formed therein a cylindrical bore, piston means mounted for reciprocatory motion within said cylindrical bore, and connecting rod means affixed at a first end to said piston means and at a second end to said first master piston means.

8. An engine retarding system as described in claim 7 wherein said trigger check valve piston means is adjustably affixed on said first end of said connecting rod means.

9. An engine retarding system as described in claim 8 comprising, in addition, firing cylinder means formed within said plenum means, said firing cylinder means communicating at a first end with said plenum means and vented at its second end, a firing piston mounted for reciprocatory motion in said firing cylinder *means* and drive pin means positioned between said firing piston and said free piston means whereby the pressure in said plenum means acting on said firing piston biases said free piston means outwardly from said plenum means.

10. An engine retarding system as described in claim 1 comprising, in addition, firing cylinder means formed within said plenum means, said firing cylinder means communicating at a first end with said plenum means and vented at its second end, a firing piston mounted for reciprocatory motion in said firing cylinder means and drive pin means positioned between said firing piston [means] and said free piston *means* whereby the pressure in said plenum means acting on said firing piston biases said free piston means outwardly from said plenum means.

11. In an engine retarding system of a gas compression release type including an internal combustion engine having a pressurized lubricating oil system, intake valve means, exhaust valve means and fuel injector means, and pushtube means associated with each of said intake valve means, exhaust valve means and fuel injector means, hydraulically actuated slave piston means associated with said exhaust valve means to open said exhaust valve means at a predetermined time, control valve means and solenoid valve means communicating in series with said pressurized lubricating oil system and said hydraulically actuated slave piston means, the improvement comprising plenum means communicating with said slave piston means, first check valve means located between said slave piston means and said plenum means to permit flow of hydraulic fluid only from said slave piston means into said plenum means, driving cylinder means communicating with said plenum means, free piston means having first and second ends mounted for reciprocatory motion in said driving cylinder means, spring means biasing said free piston means outwardly from said plenum means, said free piston means communicating on said first end with said plenum means, first master cylinder means aligned with said fuel injector pushtube means and communicating with said second end of said free piston means, first master piston means mounted for reciprocatory motion in said first master cylinder means and adapted to be driven by said fuel injector pushtube means, trigger check valve means aligned with said first master piston means and communicating between said slave piston means and said second side of said free piston means to permit flow of hydraulic fluid from said slave piston means toward said free piston means, means contacting said first master piston means and adapted to open said trigger check valve means at a predetermined point during the travel of said first master piston means, second master cylinder means aligned with said intake valve pushtube means, second master piston means mounted for reciprocatory motion in said second master cylinder means and adapted to be driven by said intake valve pushtube means, and control check valve means communicating between said second end of said free piston means and said second master cylinder means.

12. An engine retarding system as described in claim 11 wherein said control check valve means comprises a control check valve cylinder communicating with said first master cylinder, a control check valve piston mounted for reciprocatory motion in said control check valve cylinder, a control check valve affixed to said control check valve piston and adapted to move between a first open position and a second checking position, biasing means located in said control check valve cylinder adapted to bias said control check valve piston and said control check valve toward the open position.

13. An engine retarding system as described in claim 12 wherein said biasing means maintains said control check valve in said first open position until a first predetermined pressure is attained at said second end of said free piston means and thereafter maintains said control valve in said second checking position until the pressure at said second end of said free piston means drops below a second predetermined pressure which is less than said first predetermined pressure.

14. An engine retarding system as described in claim 11 wherein said control check valve means comprises a control check valve adapted to move between a first open position and a second checking position, said control check valve biased toward said second checking position by the pressure communicated from said second end of said free piston means, said control check valve biased toward said first open position by the pressure communicated from said plenum means.

15. An engine retarding system as described in claim 14 wherein the pressure communicated from said second end of said free piston means acts upon a larger area of said control check valve than the area of said control check valve acted upon by the pressure communicated from said plenum means whereby said control check valve is maintained in said first open position until a first predetermined pressure is attained at said second end of said free piston means and thereafter said control check valve is maintained in said second checking position until the pressure at said second end of said free piston means drops below a second predetermined pressure which is less than said first predetermined pressure.

16. An engine retarding system as described in claim 15 wherein the pressure communicated from said plenum means to said control check valve is communicated by an axially movable pin member exposed on a first end to the pressure existing in said plenum means and on a second end to said control check valve.

17. An engine retarding system as described in claim 11 wherein said trigger check valve comprises a valve chamber, a tubular valve element having a seat at a first end and a discharge hole at a second end, spring means biasing said tubular valve element towards a seated position in said valve chamber, said tubular valve element having formed therein a cylindrical bore, piston means mounted for reciprocatory motion within said cylindrical bore, and connecting rod means affixed at a first end to said piston means and at a second end to said first master piston means.

18. An engine retarding system as described in claim 17 wherein said trigger check valve piston means is adjustably affixed on said first end of said connecting rod means.

19. An engine retarding system as described in claim 18 comprising, in addition, firing cylinder means formed within said plenum means, said firing cylinder means communicating at a first end with said plenum means and vented at its second end, a firing piston mounted for reciprocatory motion in said firing cylinder *means* and drive pin means positioned between said firing piston and said free piston means whereby the pressure in said plenum means acting on said firing piston biases said first piston means outwardly from said plenum means.

20. An engine retarding system as described in claim 11 comprising, in addition, firing cylinder means formed within said plenum [piston] means, said firing cylinder means communicating at a first end with said plenum means and vented at its second end, a firing piston mounted for reciprocatory motion in said firing cylinder means and drive pin means positioned between said firing piston [means] and said free piston *means* whereby the pressure in said plenum means acting on said firing piston biases said free piston means outwardly from said plenum means.

21. A process for compression release retarding of a cycling multi-cylinder four cycle internal combustion engine having a crankshaft and an engine piston operatively connected to said crankshaft for each cylinder thereof and having intake and exhaust valves and intake and exhaust pushtubes for each cylinder thereof, said engine having, in addition, an hydraulic slave piston and cylinder associated with each exhaust valve, an hydraulic master piston and cylinder associated with each intake and exhaust pushtube, a plenum hydraulically interconnected with the slave cylinders and master cylinders through check valves, a trigger check valve communicating between the said plenum and said master cylinder associated with each exhaust pushtube through a free piston biased to move outwardly with respect to said plenum by the pressure in said plenum, and a control check valve communicating between said master cylinders associated with each intake and exhaust pushtube comprising, for at least one cylinder thereof, the steps of reducing the flow of fuel to said cylinder, increasing the pressure in said plenum so as to absorb energy therein by driving said master piston associated with said intake pushtube by said pushtube thereby biasing said free piston in an inward direction with respect to said plenum, further increasing the pressure in said plenum so as to absorb additional energy therein by driving said master piston associated with said exhaust pushtube by said exhaust pushtube thereby further biasing said free piston in an inward direction with respect to said plenum, releasing said energy absorbed in said plenum from said plenum at a predetermined point in the travel of said master piston associated with said exhaust pushtube by opening said trigger check valve interposed between said plenum and said exhaust valve slave piston, and applying said absorbed energy to said exhaust valve slave piston through the motion of said free piston outwardly with respect to said plenum and biased by the pressure in said plenum when said engine piston is approaching its top dead center position during a compression stroke of the said cycling multi-cylinder four stroke cycle engine.

22. A process for compression release retarding of a cycling multi-cylinder four cycle internal combustion engine having a crankshaft and an engine piston operatively connected to said crankshaft for each cylinder thereof and having a fuel injector, intake valves and exhaust valves and fuel injector pushtubes, intake valve pushtubes and exhaust valve pushtubes for each cylinder thereof, said engine having, in addition, an hydraulic slave piston and cylinder associated with each exhaust valve, an hydraulic master piston and cylinder associated with each fuel injector pushtube and each intake pushtube, a plenum hydraulically interconnected with said slave cylinders and master cylinders through check valves, a trigger check valve communicating between said plenum and said master cylinder associated with each exhaust pushtube through a free piston biased to move outwardly with respect to said plenum by the pressure in said plenum, and a control check valve communicating between said master cylinders associated with each fuel injector and intake valve pushtube, comprising for at least one cylinder thereof, the steps of reducing the flow of fuel to said cylinder, increasing the pressure in said plenum so as to absorb energy therein by driving said master piston associated with said intake pushtube by said intake pushtube, thereby biasing said free piston in an inward direction with respect to said plenum, further increasing the pressure in said plenum so as to absorb additional energy therein by driving said master piston associated with said fuel injector pushtube by said fuel injector pushtube, thereby further biasing said free piston in an inward direction with respect to said plenum, releasing said energy absorbed in said plenum from said plenum at a predetermined point in the travel of said master piston associated with said fuel injector pushtube by opening said trigger check valve interposed between said plenum and said exhaust valve slave piston, and applying said absorbed energy to said exhaust valve slave piston through the motion of the free piston outwardly with respect to said plenum and biased by the pressure in said plenum when said engine piston is approaching its top dead center position during a compression stroke of the said cycling multi-cylinder four stroke cycle engine.

*23. In an engine retarding system of a gas compression release type including an internal combustion engine having a pressurized lubricating oil system, intake valve means, exhaust valve means, and pushtube means associated with each of said intake valve means and exhaust valve means, hydraulically actuated slave piston means associated with said exhaust valve means to open said exhaust valve means at a predetermined time, control valve means and solenoid valve means communicating in series with said pressurized lubricating oil system and said hydraulically actuated slave piston means, the improvement comprising plenum means communicating with said slave piston means, first check valve means located between said slave piston means and said plenum means to permit flow of hydraulic fluid only from said slave piston means into said plenum, driving cylinder means communicating with said plenum, free piston means having first and second ends mounted for reciprocatory motion in said driving cylinder means, spring means biasing said free piston means outwardly from said plenum, said free piston means communicating on said first end with said plenum means, master cylinder means aligned with at least one of said*

*intake and exhaust valve pushtube means and communicating with the second end of said free piston means, master piston means mounted for reciprocatory motion in said master cylinder means and adapted to be driven by said pushtube means, trigger check valve means aligned with said master piston means and communicating between said slave piston means and said second side of said free piston means to permit flow of hydraulic fluid from said slave piston means toward said free piston means, means contacting said master piston means and adapted to open said trigger check valve means at a predetermined point during the travel of said master piston means.*

*24. An engine retarding system as described in claim 23 wherein said trigger check valve comprises a valve chamber, a tubular valve element having a seat at a first end and a discharge hole at a second end, spring means biasing said tubular valve element towards a seated position in said valve chamber, said tubular valve element having formed therein a cylindrical bore, piston means mounted for reciprocatory motion within said cylindrical bore, and connecting rod means affixed at a first end to said piston means and at a second end to said master piston means.*

*25. An engine retarding system as described in claim 24 wherein said trigger check valve piston means is adjustably affixed on said first end of said connecting rod means.*

*26. An engine retarding system as described in claim 25 comprising, in addition, firing cylinder means formed within said plenum means, said firing cylinder means communicating at a first end with said plenum means and vented at its second end, a firing piston mounted for reciprocatory motion in said firing cylinder means and drive pin means positioned between said firing piston and said free piston means whereby the pressure in said plenum means acting on said firing piston biases said free piston means outwardly from said plenum means.*

*27. An engine retarding system as described in claim 23 comprising, in addition, firing cylinder means formed within said plenum means, said firing cylinder means communicating at a first end with said plenum means and vented at its second end, a firing piston mounted for reciprocatory motion in said firing cylinder means and drive pin means positioned between said firing piston and said free piston means whereby the pressure in said plenum means acting on said firing piston biases said free piston means outwardly from said plenum means.*

*28. In an engine retarding system of a gas compression release type including an internal combustion engine having a pressurized lubricating oil system, intake valve means, exhaust valve means and fuel injector means, and pushtube means associated with each of said intake valve means, exhaust valve means and fuel injector means, hydraulically actuated slave piston means associated with said exhaust valve means to open said exhaust valve means at a predetermined time, control valve means and solenoid valve means communicating in series with said pressurized lubricating oil system and said hydraulically actuated slave piston means, the improvement comprising plenum means communicating with said slave piston means, first check valve means located between said slave piston means and said plenum means to permit flow of hydraulic fluid only from said slave piston means into said plenum means, driving cylinder means communicating with said plenum means, free piston means having first and second ends mounted for reciprocatory motion in said driving cylinder means, spring means biasing said free piston means outwardly from said plenum means, said free piston means communicating on said first end with said plenum means, master cylinder means aligned with at least one of said intake, exhaust and fuel injector pushtube means and communicating with said second end of said free piston means, master piston means mounted for reciprocatory motion in said master cylinder means and adapted to be driven by said pushtube means, trigger check valve means aligned with said master piston means and communicating between said slave piston means and said second side of said free piston means to permit flow of hydraulic fluid from said slave piston means toward said free piston means, means contacting said master piston means and adapted to open said trigger check valve means at a predetermined point during the travel of said first master piston means.*

*29. An engine retarding system as described in claim 28 wherein said trigger check valve comprises a valve chamber, a tubular valve element having a seat at a first end and a discharge hole at a second end, spring means biasing said tubular valve element towards a seated position in said valve chamber, said tubular valve element having formed therein a cylindrical bore, piston means mounted for reciprocatory motion within said cylindrical bore, and connecting rod means affixed at a first end to said piston means and at a second end to said master piston means.*

*30. An engine retarding system as described in claim 24 wherein said trigger check valve piston means is adjustably affixed on said first end of said connecting rod means.*

*31. An engine retarding system as described in claim 30 comprising, in addition, firing cylinder means formed within said plenum means, said firing cylinder means communicating at a first end with said plenum means and vented at its second end, a firing piston mounted for reciprocatory motion in said firing cylinder means and drive pin means positioned between said firing piston and said free piston means whereby the pressure in said plenum means acting on said firing piston biases said free piston means outwardly from said plenum means.*

*32. An engine retarding system as described in claim 28 comprising, in addition, firing cylinder means formed within said plenum means, said firing cylinder means communicating at a first end with said plenum means and vented at its second end, a firing piston mounted for reciprocatory motion in said firing cylinder means and drive pin means positioned between said firing piston and said free piston means whereby the pressure in said plenum means acting on said firing piston biases said free piston means outwardly from said plenum means.*

*33. A process for compression release retarding of a cycling multi-cylinder four-cycle internal combustion engine having a crankshaft and an engine piston operatively connected to said crankshaft for each cylinder thereof and having intake and exhaust valves and intake and exhaust pushtubes for each cylinder thereof, said engine having, in addition, an hydraulic slave piston and cylinder associated with each exhaust valve, an hydraulic master piston and cylinder associated with at least one of said intake and exhaust pushtubes, at least one plenum hydraulically interconnected with at least one of said slave cylinders and its associated master cylinder through a check valve, a trigger check valve communicating between said plenum and said master cylinder through a free piston biased to move outwardly with respect to said plenum by a combination of the pressure in said plenum and spring means comprising, for at least one cylinder thereof, the steps of reducing the flow of fuel to said cylinder, increasing the pressure in said plenum so as to absorb energy therein by driving said master piston by said pushtube thereby biasing said free piston in an inward direction with respect to said plenum, releasing said energy absorbed in said plenum from said plenum*

*at a predetermined point in the travel of said master piston by opening said trigger check valve interposed between said plenum and said exhaust valve slave piston, and applying said absorbed energy to said exhaust valve slave piston through the motion of said free piston outwardly with respect to said plenum and biased by the pressure in said plenum and said spring means when said engine piston is approaching its top dead center position during a compression stroke of the said cycling multi-cylinder four-stroke cycle engine.*

*34. A process for compression release retarding of a cycling multi-cylinder four-cycle internal combustion engine having a crankshaft and an engine piston operatively connected to said crankshaft for each cylinder thereof and having a fuel injector, intake valves and exhaust valves and fuel injector pushtubes, intake valve pushtubes and exhaust valve pushtubes for each cylinder thereof, said engine having, in addition, an hydraulic slave piston and cylinder associated with each exhaust valve, an hydraulic master piston and cylinder associated with at least one of said fuel injector, intake valve and exhaust valve pushtubes, at least one plenum hydraulically interconnected with at least one of said slave cylinders and its associated master cylinder through a check valve, a trigger check valve communicating between said plenum and said master cylinder through a free piston biased to move outwardly with respect to said plenum by a combination of the pressure in said plenum and spring means, comprising, for at least one cylinder thereof, the steps of reducing the flow of fuel to said cylinder, increasing the pressure in said plenum so as to absorb energy therein by driving said master piston by said pushtube thereby biasing said free piston in an inward direction with respect to said plenum, releasing said energy absorbed in said plenum from said plenum at a predetermined point in the travel of said master piston by opening said trigger check valve interposed between said plenum and said exhaust valve slave piston, and applying said absorbed energy to said exhaust valve slave piston through the motion of said free piston outwardly with respect to said plenum and biased by the pressure in said plenum and said spring means when said engine piston is approaching its top dead center position during a compression stroke of the said cycling multi-cylinder four-stroke cycle engine.*

* * * * *